Nov. 5, 1935.  H. D. MORTON  2,019,866
PROTECTIVE SYSTEM FOR ELECTRIC METERS
Filed Oct. 20, 1933
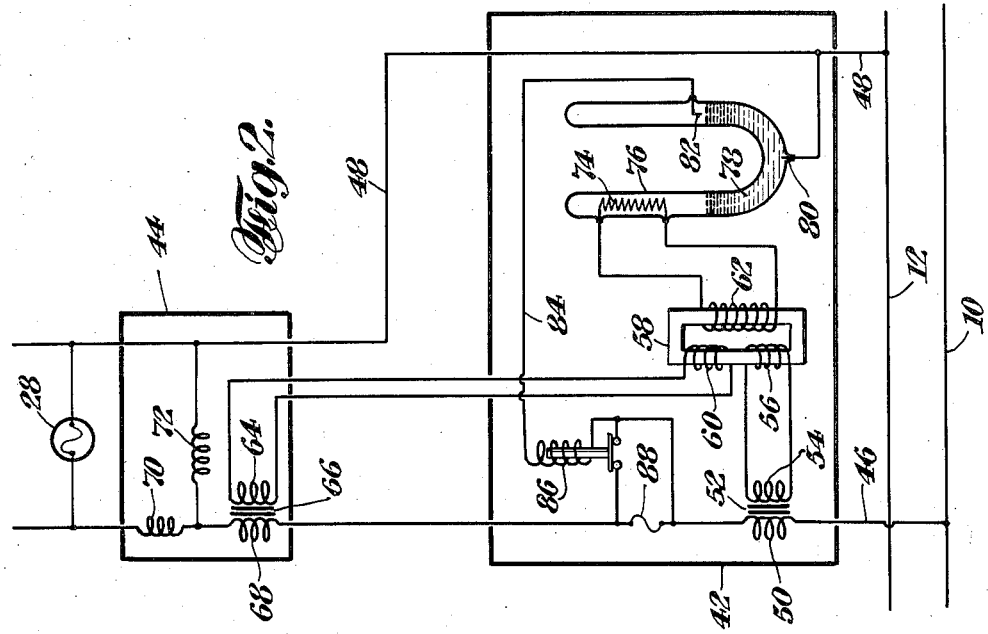
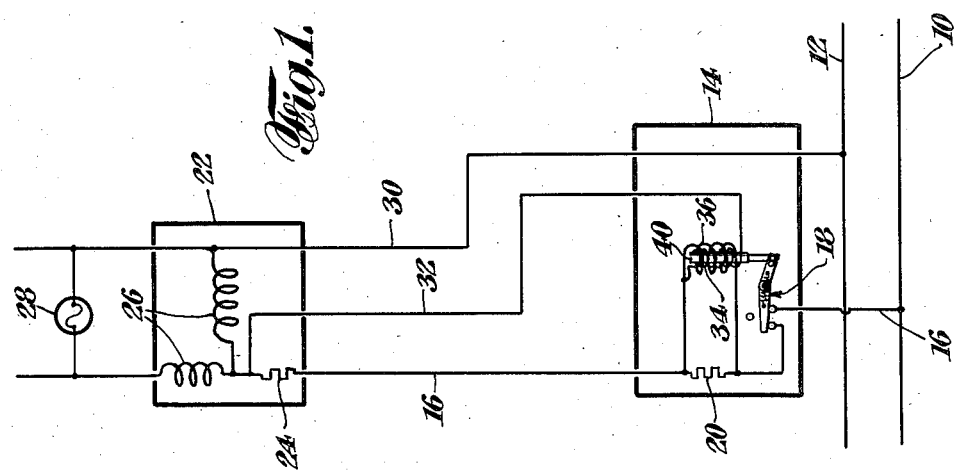
INVENTOR
Harry D. Morton
BY
Prindle, Bean & Mann
ATTORNEYS Patented Nov. 5, 1935

2,019,866

UNITED STATES PATENT OFFICE 2,019,866

PROTECTIVE SYSTEM FOR ELECTRIC METERS

Harry D. Morton, New York, N. Y., assignor to William C. Canfield, trustee

Application October 20, 1933, Serial No. 694,391

5 Claims. (Cl. 171—34)

It is customary in supplying electrical energy to a consumer, to run supply wires from a relatively inaccessible point at the main supply lines (as for example from the top of a pole) into the consumer's premises, and to fix the meter at an accessible point on the consumer's premises. The very accessibility of this meter frequently leads to substantial losses to the electric light companies, as consumers can readily by-pass or "jump" the meter and carry the electrical energy into their service lines without the consumption of this energy being recorded.

The present invention relates to a structure whereby an apparatus is positioned at a relatively inaccessible point (as for example at the point where the consumer's service lines are connected to the main supply lines) and this apparatus is connected to a device within the meter, the whole being so constructed that if the electrical energy passing into the meter is less than the electrical energy withdrawn from the main supply lines, then a definite indication of this difference will be given. Such indication ordinarily will take the form of entirely cutting off the supply of energy, or this energy may be supplied through a high resistance so that only a small amount will be delivered, or it may be supplied for example through some other device, such as a flasher which will interrupt the service periodically. Any such device or result is intended to be included when reference is made to the fact that the normal flow of current is interrupted.

In carrying out this invention, some means is supplied so that the current leaving the main supply line can be compared with the current entering into the meter. This may be done by the use of resistances and shunt circuits, but with alternating current an equivalent result can be had by the use of two identical transformers, one of which is positioned at the inaccessible point and the other of which is located within the meter casing. The electrical energy passes through the primaries of these transformers and as only a few turns are needed in these primaries, the energy consumed will be very small. The secondaries of these two transformers are connected to a common point which will ordinarily be the inaccessible point, though if desired this point may be contained in a locked box adjacent the meter. At this point apparatus is supplied, controlled by the two secondary circuits, and this apparatus is so constructed that if the current in the secondary circuit of the transformer located within the meter falls substantially below the current of the other secondary circuit, then the service line will be broken through the operation of an appropriate switch, or some other indication will be given as set forth above.

My invention can readily be understood by reference to the accompanying drawing, in which Fig. 1 shows diagrammatically a system applicable either to direct or alternating current, while Fig. 2 shows diagrammatically a more complicated but more efficient embodiment of the invention which in this particular form is adapted only to alternating current.

Referring now to Fig. 1, the numerals 10 and 12 represent the mains or main supply lines. Adjacent the point where the supply is drawn from these lines is positioned a casing 14. Connected to line 10 is a service wire 16 which goes into casing 14 and runs to one terminal of the toggle switch 18. From the toggle switch 18 this line runs through a resistance 20 and thence out of the casing 14 to the meter casing 22. Inside the meter casing 22 the wire 16 is connected to a resistance 24 and thence runs through the usual meter windings indicated at 26 to the consumer's supply as indicated by the lamp 28. Service wire 30 runs from main supply line 12 into the meter casing 22 and may pass through the protective casing 14 or not as desired.

Wire 32 is connected on the meter side of resistance 24 and runs to winding 34, the opposite end of which is connected to wire 16 at any convenient point. A second winding 36 wound in opposition to the winding 34 is connected to wire 16 on opposite sides of resistance 20. Resistances 20 and 24 are so balanced with their circuits that under normal circumstances the same amount of current will flow through coils 34 and 36. These coils operate the armature 40 which in turn is connected to the toggle switch 18 and these coils are wound in opposition to each other so that when they are subjected to equal excitation their effect is neutralized. In the normal operation of the device, the switch 18 is closed and as coils 34 and 36 neutralize each other, this switch will remain closed. If, however, the meter casing 22 is by-passed, the amount of current supplied to winding 34 will drop off, and thereupon coil 36 will be able to function and will open toggle switch 18, disconnecting all supply to the premises. To restore service the electric company will have to open casing 14 and close switch 18 and of course they will not do this unless the meter 22 is functioning properly.

In the embodiment shown in Fig. 2, there is a protective casing 42 and the meter casing is here indicated by the numeral 44. From the mains 10 and 12 service lines 46 and 48 run into casing 42 which may be positioned near the mains 10 and 12.

Connected in series with service line 46 is the primary 50 (which may consist of a few turns of the service wire) of a small current transformer 52. The secondary 54 of this transformer supplies current to a primary winding 56 of a balanced transformer 58. This balanced transformer also provided with another primary winding 60 which is wound differentially with reference to the winding 56 so that when equal current is supplied to the windings 56 and 60 there will be no induced current in the secondary 62.

Current is supplied to winding 60 from the secondary 64 of a third transformer 66, similar to transformer 52, installed in the meter casing 44 or in an auxiliary housing permanently attached to the meter casing. The primary 68 of the meter casing transformer 66, like primary 50 of transformer 52, is connected in series in the service line 46 and like winding 50 may consist of a few turns of the service wire. 70 indicates the series winding and 72 the potential winding of the meter. The load circuit is here indicated, as in the previous instance, as connected to the lamp 28. It is intended that transformers 52 and 66 shall be of identical design and construction, and the circuits which include their secondary windings are initially so adjusted as to resistance and impedance that the magnitude of their respective current outputs is the same, and so that their currents are in phase. Transformer windings 56 and 60 being identical but oppositely wound, it follows that so long as all the current flowing through primary winding 50 also flows through primary winding 68, a condition of equilibrium obtains in the transformer 58 and there is no output from the secondary winding 62.

The secondary winding 62 of transformer 58 is here shown as connected to a resistance heating element 74, the terminals of which are fused in the walls of one branch of the hermetically sealed U-shaped glass tube 76. In the lower portion of this tube is a mass of mercury indicated at 78, immersed in which is a terminal 80 fused in the wall of the glass tube 76 near the bottom thereof and connected to service line 48. Fused in the wall of the U-tube 76 at a position above the level of the mercury 78 and in the opposite arm from the heater element 74 is a terminal 82 connected by a line 84 to one terminal of an electromagnetically operated switch or relay 86, the other terminal of which is connected to the service line 46. The relay 86 operates a switch interposed in the service line 46, but I find it desirable to interpose a fuse as indicated at 88 which is shunted across the terminals of this switch.

From this construction it will be seen that if the current flowing into the primary winding 60 of transformer 58 is substantially reduced (as will be the case if one jumps or by-passes the meter 44) an electrical flow will be set up in secondary 62, which will heat resistance element 74 causing the vapor or air in that end of the tube to expand so that the mercury rises in the opposite arm of the tube 76 making a contact between terminal 80 and terminal 82, thus energizing relay 86 to break the circuit, and causing all of the energy passing through service line 46 to pass through the fuse 88 which will quickly burn out. The fuse 88 is not essential, but I find it advisable to use the same as it will prevent undue sparking at the relay when the flow of current through the main service line is interrupted. In any event, rregular service cannot be established until the shunt circuit is removed, the protective casing 42 opened and the relay 86 operated manually to close the regular circuit in supply line 46, and at that time the fuse 88 will be replaced.

It is to be noted that in each of the constructions shown the energy withdrawn from within the meter housing is used to prevent the device from functioning, so that any attempt to eliminate the control device by cutting the supplemental wires that run from the meter housing will immediately cause the device to operate. Also due to the fact that a balance must be maintained, if transformer 52 is put on the pole and the rest of the control equipment at a convenient place on the consumer's premises, or included in the meter housing, cutting the wires from transformer 52 will serve to operate the device.

What I claim is:

1. In a device of the type described in combination with a source of electrical supply and an electric meter, means for withdrawing energy from a point within the meter and similar means for withdrawing energy from a point in series with the meter and intermediate the meter and the supply and positioned at a point substantially removed from the meter and relatively inaccessible thereto, and means controlled by the relationship of the energy withdrawn from said points such that if the flow of energy withdrawn from within the meter falls substantially below the flow of energy from said intermediate point or if any connection between such intermediate point and the meter is broken, the supply of electricity to the meter will be interrupted.

2. In combination with a source of electrical supply, an electric meter and a load circuit, a transformer substantially enclosed with the meter and having its primary in series with one of the feed lines to the meter, a second transformer having its primary in series with the first transformer but located at a point intermediate the meter and the source of supply and having its secondary in a circuit independent of the secondary of such first transformer, a relay between said supply and said load circuit and means controlled by said secondary circuits whereby said relay will operate to open a connection between the electrical supply and the load circuit if substantially less energy flows through the primary of one of said transformers than through the primary of the other of said transformers.

3. In combination with a source of electrical supply, an electric meter and a load circuit, a transformer in the meter casing in series with the supply to the meter, a second similar transformer having its primary in series with the meter and supply positioned at a point remote from the meter, opposed coils connected to the secondaries of said transformers but in electrically independent circuits and a relay in the supply line to the meter, and means whereby said relay is operated if the current in one of said opposed coils becomes substantially less than the current in the other of said coils.

4. In combination with a source of electric supply, an electric meter and a load circuit, a transformer substantially enclosed with the meter and having its primary in series with one of the feed lines to the meter, a second transformer having its primary in series with the first transformer but located at a point intermediate the meter and the source of supply and having its secondary in a circuit independent of the secondary of such first transformer, and means controlled by the relationship of the current induced in the secondaries of said two transformers such that if the flow of current from the secondary of the transformer substantially enclosed with the meter falls substantially below the flow of current from the secondary of the other transformer, the flow of electricity from the supply to the load circuit will be interrupted.

5. In combination with a source of electric supply, an electric meter and a load circuit, a transformer substantially enclosed with the meter and having its primary in series with one of the feed lines to the meter, a second transformer having its primary in series with the first transformer but located at a point intermediate the meter and the source of supply and having its secondary in a circuit independent of the secondary of such first transformer, a relay, a fuse in the line between said supply and said load circuit and means controlled by said secondary circuits, whereby if substantially less energy flows through the primary of one of said transformers than through the primary of the other of said transformers, said relay will operate to cause said fuse to be blown.

HARRY D. MORTON.